United States Patent
Ohnemus et al.

(10) Patent No.: US 11,892,041 B2
(45) Date of Patent: Feb. 6, 2024

(54) COUPLING DEVICE, IN PARTICULAR FOR A DRIVE TRAIN OF A MOTOR VEHICLE, AND DRIVE DEVICE FOR A MOTOR VEHICLE

(71) Applicant: Bayerische Motoren Werke Aktiengesellschaft, Munich (DE)

(72) Inventors: Ulrich Ohnemus, Hattenhofen (DE); Fritz Pobitzer, Roehrmoos (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 17/639,434

(22) PCT Filed: Sep. 3, 2020

(86) PCT No.: PCT/EP2020/074603
§ 371 (c)(1),
(2) Date: Mar. 1, 2022

(87) PCT Pub. No.: WO2021/063623
PCT Pub. Date: Apr. 8, 2021

(65) Prior Publication Data
US 2022/0299070 A1    Sep. 22, 2022

(30) Foreign Application Priority Data
Oct. 1, 2019    (DE) .................... 10 2019 126 422.7

(51) Int. Cl.
*F16D 41/16* (2006.01)
*F16D 27/108* (2006.01)
*F16D 27/00* (2006.01)

(52) U.S. Cl.
CPC ........... *F16D 41/16* (2013.01); *F16D 27/004* (2013.01); *F16D 27/108* (2013.01)

(58) Field of Classification Search
CPC ....... F16D 41/16; F16D 27/004; F16D 27/108
See application file for complete search history.

(56) References Cited

U.S. PATENT DOCUMENTS

| 4,187,728 A | 2/1980 | Mazzorana |
| 7,721,860 B2 | 5/2010 | Saka |
| (Continued) | | |

FOREIGN PATENT DOCUMENTS

| CN | 105387203 A | 3/2016 |
| CN | 105593555 A | 5/2016 |
| (Continued) | | |

OTHER PUBLICATIONS

International Search Report (PCT/ISA/210) issued in PCT Application No. PCT/EP2020/074603 dated Nov. 20, 2020 with English translation (five (5) pages).

(Continued)

*Primary Examiner* — David R Morris
(74) *Attorney, Agent, or Firm* — Crowell & Moring LLP

(57) ABSTRACT

A coupling device has two components which are rotatable relative to one another, a recess which is provided on the first component, and a locking element which is held movably on the second component and is movable relative to the components between a locking position in which the locking element engages in the recess and a release position in which engagement of the locking element in the recess is prevented. An actuating device is provided which is displaceable relative to the components and relative to the locking element and which has an actuating element formed from a first material, by which a movement of the locking element out of one of the positions into the other position can be effected by displacement of the actuating device. The actuating device has a main body which is formed from a second material which is different from the first material.

17 Claims, 8 Drawing Sheets

(56) References Cited

U.S. PATENT DOCUMENTS

| | | | |
|---|---|---|---|
| 8,646,587 B2* | 2/2014 | Kimes | F16D 41/125 |
| | | | 192/84.92 |
| 11,542,992 B2* | 1/2023 | Essenmacher | F16D 41/14 |
| 2012/0145505 A1* | 6/2012 | Kimes | F16D 41/125 |
| | | | 192/45.1 |
| 2015/0060225 A1 | 3/2015 | Kimes | |
| 2016/0061324 A1 | 3/2016 | Sten et al. | |
| 2016/0160941 A1 | 6/2016 | Green et al. | |
| 2019/0170198 A1 | 6/2019 | Kimes | |
| 2019/0178359 A1* | 6/2019 | Komatsu | F16H 48/42 |
| 2021/0262533 A1 | 8/2021 | Liebert | |
| 2021/0301885 A1* | 9/2021 | Essenmacher | F16D 41/14 |
| 2022/0010855 A1* | 1/2022 | Liebert | F16D 27/10 |

FOREIGN PATENT DOCUMENTS

| | | |
|---|---|---|
| CN | 107850137 A | 3/2018 |
| CN | 110067822 A | 7/2019 |
| DE | 28 02 773 A1 | 8/1978 |
| EP | 1 408 250 A1 | 4/2004 |
| EP | 1 696 146 A1 | 8/2006 |
| WO | WO 2014/110319 A1 | 7/2014 |
| WO | WO 2016/160101 A1 | 10/2016 |
| WO | WO 2017/091433 A1 | 6/2017 |
| WO | WO 2020/030391 A1 | 2/2020 |

OTHER PUBLICATIONS

German-language Written Opinion (PCT/ISA/237) issued in PCT Application No. PCT/EP2020/074603 dated Nov. 20, 2020 (six (6) pages).

German-language Search Report issued in 10 2019 126 422.7 Application No. German dated Apr. 16, 2020 with partial English translation (10 pages).

Chinese-language Office Action issued in Chinese Application No. 202080062599.5 dated Apr. 14, 2023 with English translation (15 pages).

* cited by examiner

COUPLING DEVICE, IN PARTICULAR FOR A DRIVE TRAIN OF A MOTOR VEHICLE, AND DRIVE DEVICE FOR A MOTOR VEHICLE

BACKGROUND AND SUMMARY OF THE INVENTION

The invention relates to a coupling device, in particular a coupling device for a drive train of an automobile. The invention furthermore relates to a drive device for an automobile, in particular for a car.

WO 2017/091433 A1 discloses an electromechanical apparatus which can be used in a controllable coupling. In addition, WO 2014/110319 A1 discloses a controllable or selectable coupling assembly. U.S. Pat. No. 7,721,860 B2 furthermore discloses a power coupling device.

It is an object of the present invention to provide a coupling device for a vehicle and a drive device for an automobile, such that the coupling device can be actuated in a particularly advantageous way.

This object is achieved according to the invention by a coupling device and by a drive device having the features of the independent claims. The dependent claims relate to advantageous configurations of the invention.

A first aspect of the invention relates to a coupling device for a vehicle, which is preferably in the form of an automobile, in particular a car, and in this respect very preferably in the form of a passenger car. For example, the coupling device can be used in a or for a transmission of the vehicle. The coupling device comprises a first component and a second component, which is formed separately from the first component and in principle can be rotated about an axis of rotation relative to the first component. As will be explained in more detail below, the components may be at least temporarily rotationally conjointly connected to one another by means of the coupling device. The respective component may for example be a shaft or a shaft part, in particular of the transmission, or the respective component may be rotationally conjointly connected or connectable to a shaft, in particular of the transmission. The coupling device has at least one recess, also referred to as first recess, which for example is provided or arranged on the first component. For example, the first recess is formed separately from the first component and is rotationally conjointly connected to the first component. It is also contemplated that the first recess is formed by the first component, in particular directly.

The coupling device moreover comprises at least one blocking element, which is held movably, in particular pivotably, on the second component. For example, the blocking element can be moved relative to the second component while the blocking element is held on the second component, that is to say is connected to the second component. For example, the blocking element can be pivoted about a pivot axis relative to the second component and as a result can be moved relative to the second component. In this context, it is preferably provided that the pivot axis runs at least substantially parallel to the axis of rotation.

The blocking element can be moved, in particular pivoted, relative to the components between at least a blocking position and at least a release position. The blocking position is a first position of the blocking element or the blocking position is also referred to as first position of the blocking element. The release position is a second position of the blocking element or the release position is also referred to as second position of the blocking element. In the blocking position, the blocking element engages in the first recess, as a result of which in the blocking position the blocking element prevents a relative rotation between the components about the axis of rotation in at least one or precisely one direction of rotation. Consequently for example, in the blocking position of the blocking element, the components are connected to one another for conjoint rotation at least or precisely in the direction of rotation by means of the blocking element. In the present case, the freewheel is used as form-fitting switching element virtually without a freewheel function in the one or the the other direction of rotation. The switching element function is limited to closed in both directions of rotation or open in both directions of rotation.

The direction of rotation is also referred to as first direction of rotation and runs about the axis of rotation. In particular, it is contemplated that the blocking element, in particular the coupling device as a whole, in the blocking position permits a relative rotation between the components about the axis of rotation in a second direction of rotation oppositely directed to the first direction of rotation, with the result that the coupling device can function as or be in the form of a freewheel, for example, in particular a switchable freewheel.

In the release position, the blocking element is prevented from engaging in the first recess, with the result that for example the blocking element in the release position is arranged completely outside the first recess. This means that the blocking element in the release position permits a relative rotation between the components, also referred to as component parts, about the axis of rotation in the first direction of rotation. In other words, the blocking element in the release position releases the components for a relative rotation between the components about the axis of rotation in the first direction of rotation.

In particular, provision can be made for example that in the blocking position of the blocking element the components are connected to one another for conjoint rotation in the first direction of rotation by means of the blocking element, whereas in the release position a relative rotation between the components in the second direction of rotation is possible. As an alternative or in addition, it is contemplated that in the release position the components can be rotated relative to one another both in the first direction of rotation and in the second direction of rotation, with the result that for example the abovementioned switchable freewheel is activated or blocked in the blocking position and deactivated or open in the release position. As a result, the coupling device makes it possible to couple the components especially as-needed, rotationally conjointly and thus torque-transmissively.

In order now to be able to actuate the coupling device particularly advantageously, that is to say in order to be able to move, in particular pivot, the blocking element particularly advantageously between at least one of the positions and the corresponding other position, it is provided according to the invention that the coupling device has at least one actuating device which can be displaced along the axis of rotation relative to the components and relative to the blocking element. The actuating device comprises an actuating element, formed from a first material and preferably formed separately from the blocking element and separately from the components, by means of which a movement of the blocking element out of the at least one position into the corresponding other position can be brought about by displacing the actuating device and thus concomitantly displacing the actuating element. In other words, in order for example to move the blocking element out of the at least one position into the respective other position, the actuating device and thus the actuating element are to be displaced or are displaced along the axis of rotation, that is to say for example in a direction of movement, which runs parallel to the axis of rotation, relative to the component and relative to the blocking element, which is situated for example initially in the at least one position. In this way for example the actuating element, which for example initially is spaced apart from the blocking element and thus does not touch the blocking element, comes to at least indirectly, in particular directly, lie in a supporting manner against the blocking element, with the result that for example the actuating element directly touches the blocking element. Further displacement of the actuating device and thus of the actuating element causes the actuating element for example to slide off on the blocking element, in particular while the actuating element directly touches the blocking element, as a result of which lastly the blocking element is moved out of the at least one position into the other position.

The actuating device furthermore comprises a basic body, which is formed from a second material different than the first material and is connected to the actuating element. The second material may be a metallic material, in particular aluminum or an aluminum alloy, or else a plastic. The first material may be a metallic material, in particular a steel. In this respect for example the first material or the actuating element is hardened at least in a partial region, this partial region for example coming into direct contact with the blocking element when the actuating device is displaced. The blocking element, which is also referred to as a strut or pawl, is preferably a component part manufactured from steel and preferably hardened.

This makes it possible to avoid excessive wear of the coupling device. Preferably, the second material is a nonferritic material, such as for example a light metal alloy, in particular an aluminum alloy, or a plastic.

If the second material is a plastic, the basic body is also referred to as a plastic body. Since the actuating element is connected to the carriage (basic body), the actuating element and the carriage can be displaced or are displaced together and/or at the same time along the axis of rotation relative to the components and relative to the blocking element. At least one positioning element, by means of which a relative rotation between the actuating device and the second component and thus in particular between the actuating element and the second component about the axis of rotation is at least delimited, in particular avoided, is formed by the second material. In this respect, provision is made in particular that by means of the positioning element a relative rotation between the actuating device and the second component about the axis of rotation in the first direction of rotation and also a relative rotation between the actuating device and the second component about the axis of rotation in the second direction of rotation, oppositely directed to the first direction of rotation, is at least delimited, in particular avoided. This makes it possible to ensure an advantageous positioning of the actuating device relative to the second component about the axis of rotation in a particularly simple way that is favorable in terms of installation space, weight and cost, with the result that for example the actuating device can be displaced particularly advantageously, in particular especially smoothly and without jamming. This makes it possible to bring about a particularly advantageous and in particular smooth movement of the blocking element from the at least one position into the other position. Preferably, the at least one position is the release position, and therefore preferably the other position is the blocking position. In particular, the invention makes it possible to keep the number of parts and thus the weight, the costs and the installation space requirement of the coupling device particularly low.

In an advantageous embodiment of the invention, the second material is a plastic with which the actuating element is provided. This is in particular to be understood to mean that the actuating element is connected to the plastic or to the carriage such that the actuating element and the carriage can be displaced or are displaced together and/or at the same time along the axis of rotation relative to the components and relative to the blocking element.

Preferably, the plastic is injection molded onto the actuating element. In other words, the plastic is injection molded around at least a part of the actuating element. This makes it possible to easily ensure an advantageous positioning of the actuating element relative to the second component by way of the plastic, with the result that an advantageous actuability or switchability of the coupling device can be produced. In yet other words, the plastic is injection molded onto the in particular previously produced, preferably finished, actuating element by a plastics injection molding technique. The actuating element is thus for example an in particular fully processed insert. The plastics injection molding technique in combination with an in particular fully processed insert reduces the processing outlay and the weight of the component part.

In order to be able to particularly easily ensure a particularly advantageous positioning of the actuating device and thus of the actuating element relative to the second component, a further configuration of the invention provides that the positioning element has at least one projection, which is formed by the second material, is for example in the form of a rib, and engages in a corresponding recess, as a result of which the relative movement between the actuating device and the second component about the axis of rotation is at least delimited.

The recess is in this case for example formed directly by the second component or by a third component of the coupling device, which third component is formed separately from the second component and is rotationally conjointly connected to the second component. This makes it possible to ensure a particularly advantageous positioning of the actuating device relative to the second component and consequently a particularly advantageous actuability of the coupling device.

In order to be able to realize a particularly advantageous positioning of the actuating device relative to the second component and as a result a particularly advantageous actuation of the coupling device, a further configuration of the invention provides that the positioning element has a second recess, which is delimited, in particular directly, by the second material and in which engages at least one corresponding positioning part, which is formed separately from the positioning element and separately from the components, as a result of which the relative rotation between the actuating device and the second component about the axis of rotation is at least delimited, in particular prevented.

In this context, it has been found to be particularly advantageous when the positioning part directly touches the second material.

The second material has for example at least two, in particular directly adjoining, regions of differing porosities. A first one of the regions thus has for example a first porosity, with the second region having for example a second porosity which is greater than the first porosity. This means that the second region is more porous than the first region. In this context, it is preferably provided that the second recess is formed or delimited, in particular directly, by the first region. This makes it possible for example to realize sufficient strength or stability, with the result that the actuating device can be positioned advantageously relative to the second component. Overall, however, it is possible for example as a result to keep the weight of the actuating device particularly low. Overall, since the positioning part directly touches the second material, it is possible to keep the number of parts and thus the installation space requirement, the weight and the costs within a particularly low range.

The actuating device can for example be moved relative to the positioning part. In other words, if for example the actuating device is displaced along the axis of rotation relative to the component and relative to the blocking element, what takes place here for example is a relative movement between the actuating device and the positioning part. In particular, the positioning part slides or rolls off for example on the actuating device in the process, for example directly on the second material and thus on the basic body.

In order in this context to be able to realize a particularly advantageous and in particular especially smooth actuability of the coupling device, it being possible in addition to avoid excessive wear of the coupling device, a further configuration of the invention provides that arranged in the second recess between the second material or the basic body and the positioning part is an intermediate element, which is formed separately from the positioning part and separately from the second material or the basic body, is formed from a different material than the second material, and on which the positioning part can be supported or is supported directly. When the actuating device is displaced, although a relative movement occurs between the positioning part and the second material and between the positioning part and the intermediate element, in this respect the positioning part slides or rolls off for example not directly on the second material or on the basic body, but rather on the intermediate element. The intermediate element is for example connected to the second material or the basic body and thus can be displaced conjointly with the carriage and the actuating element along the axis of rotation relative to the components, with the result that preferably the intermediate element is a constituent part of the actuating device. Since the positioning part for example rolls or slides off directly on the intermediate element when the actuating device is displaced, it is possible to avoid excessive friction. Consequently, the actuating device can be displaced easily and smoothly.

In order in this context to keep the friction particularly low and to be able to realize a particularly good smooth movement, the material is preferably a metallic material, in particular a steel. Preferably, the intermediate element is formed separately from the actuating element, and therefore it is contemplated that the actuating element and the intermediate element are formed from different materials. However, it is also contemplated that the intermediate element is formed in one piece with the actuating element.

In particular when the positioning part for example slides off on the intermediate element when the actuating device is displaced along the axis of rotation relative to the components, the intermediate element is for example a bearing shell, in particular a sliding-bearing shell, by means of which a particularly low-friction bearing support, in particular sliding-bearing support, can be realized. The carriage with the actuating element, also referred to as insert pin or in the form of an insert pin, which can thus preferably be in the form of a stud, also referred to as pin, should not rotate on the or relative to the second component, which is also referred to as pawl plate or pocket plate, in particular about the axis of rotation, but rather can move only along the axis of rotation and thus longitudinally. Consequently, what is desirable is a bearing support which avoids or at least delimits a relative rotation between the actuating element and the second component about the axis of rotation, but permits a displacement of the carriage with the actuating element relative to the second component along the axis of rotation. This can be realized particularly advantageously by the invention. Particularly advantageously provided for this are at least two positioning parts, which are in particular in the form of rolling bodies and preferably balls or ball-bearing elements and run for example in a respective ball-bearing channel in the second component or between a respective hub and the carriage.

A further embodiment is distinguished in that at least one magnet, in particular at least one permanent magnet, by means of which the actuating device can be displaced along the axis of rotation relative to the components is at least partially embedded in the second material. The magnet, which is preferably in the form of a permanent magnet, is for example a constituent part of an actuator, also referred to as actuating means, by means of which the actuating device, in particular by utilizing electrical energy or electrical current, can be driven and as a result can be displaced along the axis of rotation relative to the components. In particular, the magnet, which is preferably in the form of a permanent magnet, is for example a constituent part of a rotor of the actuator. In this respect, the actuator may have a stator, by means of which the rotor, in particular by utilizing electrical energy or electrical current, can be driven and as a result can be displaced along the axis of rotation relative to the components.

The actuator is preferably a bistable electromagnetic linear actuator which, on account of the permanent magnet or the permanent magnets and the formation of a yoke, experiences a magnetic holding force both in the blocking position, also referred to as in the "ON" position, and in the release position, also referred to as "OFF" position. This holding force is nullified or overcompensated by the Lorentz force, which can be generated or is generated at least by coils of the actuator through which electrical current is flowing, with the result that an engagement movement or disengagement movement of the carriage, that is to say a movement of the carriage and of the actuating element between the release position and the blocking position arises. For this purpose, in the present case preferably two coils are used, in particular installed in the stator of the actuator.

The stator has for example at least one winding through which electrical current can flow, as a result of which for example the winding can provide a magnetic field for driving the rotor.

The feature whereby the magnet is at least partially, in particular at least predominantly or completely, embedded in the second material can in particular be understood to mean that the second material at least partially surrounds the magnet. Preferably, the magnet is held on the second material and thus on the carriage in a force fit and/or form fit and/or material bond and thus can be displaced conjointly with the carriage along the axis of rotation relative to the components. Consequently, the magnet may be a constituent part of the actuating device. In this context, the magnet allows an especially as-needed and thus advantageous actuation of the coupling device. Consequently, the magnet or the magnets may also be considered as inserts in the plastic, in particular during the plastics injection molding.

In order for example to realize a particularly advantageous actuability of the coupling device and to keep the number of parts thereof particularly low, for example at least a part of the magnet is covered outwardly in the radial direction of the components at least partially by at least one wall of the second material or of the basic body. For this for example the wall of the basic body is arranged on a side of the magnet that faces inward in the radial direction of the components. This causes the magnet to be held radially outwardly on the second material or the basic body in a form fit, with the result that even in the event of particularly high, radially outwardly acting centrifugal forces that act on the magnet, undesired relative movements between the magnet and the carriage can be avoided. Moreover, this makes it possible to keep the number of parts of the actuating device low, and therefore their inertia can be kept within a particularly low range. As a result, the actuating device can be displaced particularly easily and advantageously, with the result that the coupling device can be actuated easily and advantageously.

For example, on its radially inwardly facing side, the magnet has a dovetail profile, which is covered outwardly in the radial direction of the components by the second material or by the wall of the carriage. This makes it possible to secure the magnet particularly advantageously on the carriage.

It has been found to be more particularly advantageous when the second material is injection molded onto the magnet. In other words, the second material may be at least partially, in particular at least predominantly or completely, injection molded around the magnet.

Overall, the invention allows the coupling device, in particular the actuator, to be produced particularly easily and favorably in terms of time and costs. Consequently, the invention preferably also includes a method for producing the coupling device. In the course of the method, for example the actuating element and optionally the magnet, formed separately from the actuating element, are placed into a mold of an injection molding tool. Then, the second material is introduced, in particular injected, into the mold, as a result of which the second material is injection molded onto the actuating element and preferably also onto the magnet. The method thus comprises an injection molding method, by means of which the carriage is produced from the second material. Consequently, the carriage is produced by injection molding, wherein, during the injection molding or by means of the injection molding, the second material is injection molded onto the actuating element and preferably also onto the magnet. This connects the actuating element and preferably also the magnet to the carriage.

In order to be able to particularly advantageously displace the actuating device and thus particularly advantageously actuate the coupling device, a further configuration of the invention provides that the magnet is at least partially, in particular at least predominantly or completely, covered in at least one direction, in particular running parallel to the axis of rotation, by a covering plate formed from a ferromagnetic material and/or from ferritic steel. This makes it possible to realize particularly advantageous guidance of a magnetic field provided for example by the magnet, with the result that the coupling device can be advantageously actuated.

In order in this respect to particularly easily realize a particularly advantageous actuability of the coupling device, a further configuration of the invention provides that the covering plate is formed in one piece with the abovementioned intermediate element. In other words, the covering plate or the intermediate element, formed in one piece with the covering plate, is a counterpart for the positioning part, which can for example roll or slide off on the counterpart directly when the actuating device is displaced along the axis of rotation relative to the components.

In order to be able to avoid excessive friction and as a result be able to ensure a particularly advantageous and smooth actuation of the coupling device, a further configuration of the invention provides that the positioning part is a rolling body, in particular a ball, of a rolling-bearing support, in particular a ball-bearing support. By way of the rolling-bearing support, the actuating device is mounted displacably along the axis of rotation on the second component or on a module of the coupling device that is formed separately from the second component and is rotationally conjointly connected to the second component. The module may be the third component, or the module is provided separately from the third element and in addition to the third element.

In order to be able to keep actuating forces required for actuation of the coupling device particularly low, a further configuration of the invention provides that the rolling-bearing support is a linear-ball-bearing support, and therefore for example the rolling body is a linear-ball-bearing element. The linear-ball-bearing support may have a segment-like form or may be formed such that it is guided via a closed bearing ring. In this respect, for example the module is what is known as a hub, on which the actuating device is mounted displacably along the axis of rotation by way of the sliding-bearing support or rolling-bearing support.

In order lastly to be able to realize a particularly advantageous actuability of the coupling device, a further configuration of the invention provides that the basic body or the second material forms, in particular directly delimits, a groove for an actuating part which is formed separately from the actuating device and separately from the components, can be displaced along the axis of rotation relative to the components, is in the form for example of a shifting fork, and for example engages in the groove. The shifting fork may engage in the groove by way of pads, also referred to as cushions, which are formed from a special sliding material. This principle could however also be reversed, with the result that for example the shifting fork has a groove in which the second material, in particular a web formed by the second material, engages.

By means of the actuating part, the actuating device can be displaced by displacing the actuating part. In other words, the actuating part can be displaced along the axis of rotation relative to the components for example by means of a drive. Since in the process the actuating part engages in the groove, the actuating part carries along the actuating device, with the result that the actuating device can be displaced or is displaced along the axis of rotation relative to the components by displacing the actuating part. This makes it possible for example to dispense with the abovementioned actuator and thus the magnet or the rotor and the stator or the winding, and therefore a particularly advantageous actuability of the coupling device can be realized particularly favorably in terms of installation space. Of course, a combination would also be contemplated, that is to say a certain number of form-fitting switching elements, i.e. switchable freewheels, is actuated or moved by means of an individual linear actuator, and the rest by way of a shifting fork and a central linear actuator. In addition or as an alternative to the shifting fork, a shift rocker would be contemplated.

A second aspect of the invention relates to a drive device for an automobile. The automobile is preferably in the form of a car, in particular a passenger car. The automobile can be driven by means of the drive device. In this respect, the drive device comprises at least one inventive coupling device according to the first aspect of the invention. Advantages and advantageous configurations of the first aspect of the invention should be regarded as advantages and advantageous configurations of the second aspect of the invention, and vice versa.

The invention therefore also includes the use of the coupling device according to the first aspect of the invention, the coupling device being used in a or for a drive device of an automobile, which can be driven by means of the drive device. In this respect, for example at least one wheel of the automobile or the automobile overall can be driven via the coupling device and thus via the components by at least one drive motor of the automobile. For example, the coupling device is a constituent part of a transmission, via which the automobile can be driven, in particular by the drive motor.

Further details of the invention will emerge from the following description of preferred exemplary embodiments with the associated drawings.

BRIEF DESCRIPTION OF THE DRAWINGS

In the figures, identical or functionally identical elements are provided with the same reference signs.

DETAILED DESCRIPTION OF THE DRAWINGS

Figure 1:
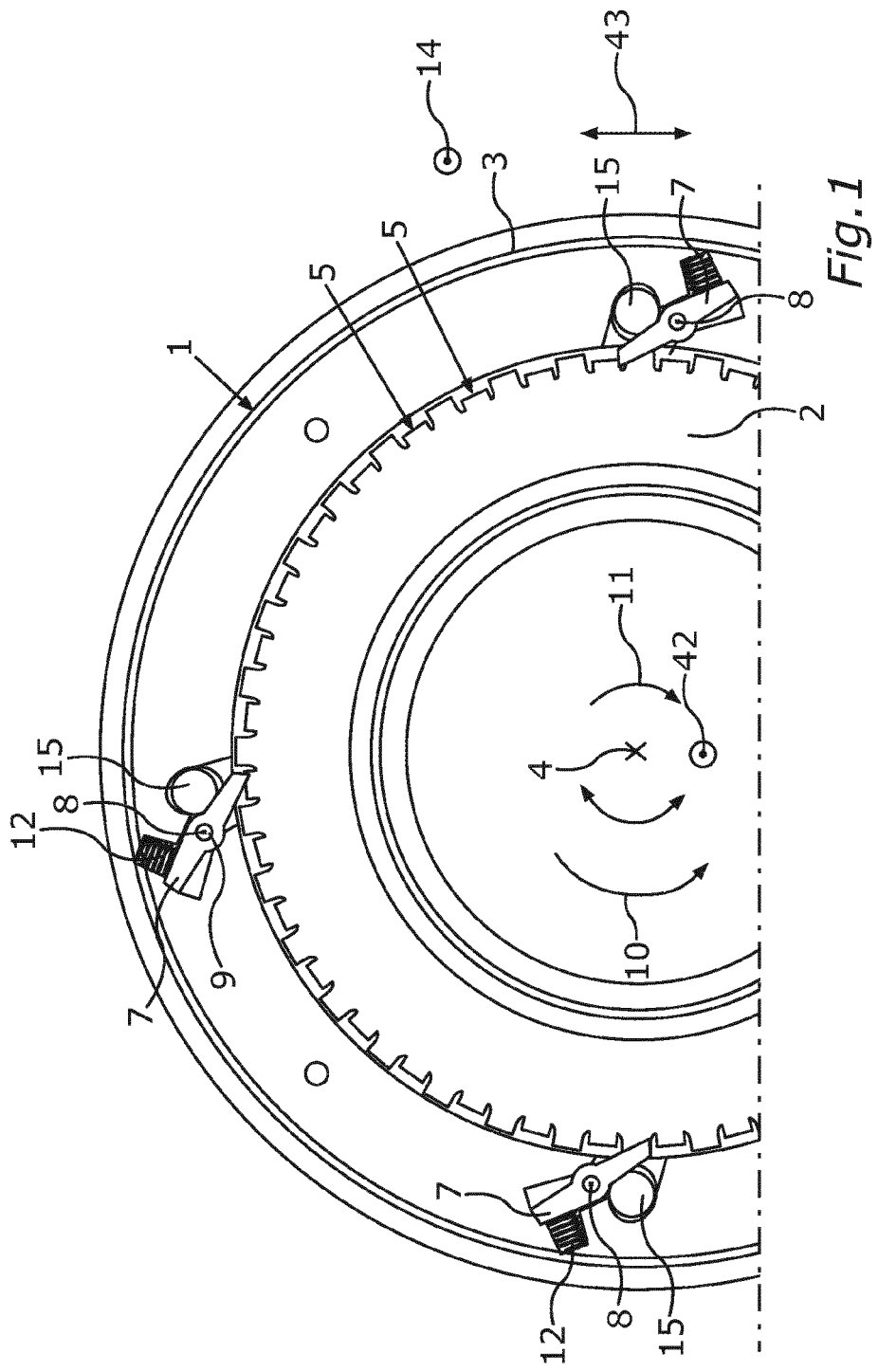
FIG. 1 shows a detail of a schematic front view of a first embodiment of a coupling device according to the invention, in particular for a drive train of an automobile.

FIG. 1 shows a detail of a schematic front view of a coupling device 1, in particular for a drive train of an automobile.

This means that, in its finished state, the automobile comprises the drive train and thus the coupling device 1. The drive train comprises for example at least one drive motor, by means of which at least one wheel, in particular at least two or precisely two wheels, of the automobile and thus the automobile overall can be driven via the coupling device 1. The drive motor is for example an internal combustion engine or an electric machine, and therefore for example the automobile can be driven electrically, in particular purely electrically, by means of the drive motor. The automobile may thus be in the form for example of a hybrid or electric vehicle, in particular a battery-electric vehicle. For the purpose of electrically driving, in particular purely electrically driving, the automobile, the electric machine is operated in motor mode and thus operated as an electric motor. In motor mode, the electric machine provides at least one torque, by means of which the automobile can be electrically driven, in particular purely electrically driven, via the coupling device 1. In particular, the drive train may have a transmission, via which the automobile can be electrically driven, in particular purely electrically driven, by the drive motor. The coupling device 1 is for example a constituent part of the transmission and in this respect is arranged for example in a housing. In other words, the coupling device 1 may be arranged in a housing of the drive train, the housing being for example a transmission housing of the transmission. The coupling device 1, which is for example in the form of a form-fitting switching element, in particular designed as a freewheel, requires only low actuating forces, since it is also the case that only small masses have to be accelerated. Consequently, synchronizers, also referred to simply as synchros, which usually require assistance from synchronization torques, generally via friction cones, and also claws, which are usually heavier than pawls of the coupling device, since they convey torque, are not taken into consideration or required here. In principle, the reduction in the actuating forces results in a lightweight approach with plastics injection molding, as will be explained further below.

Figure 2:
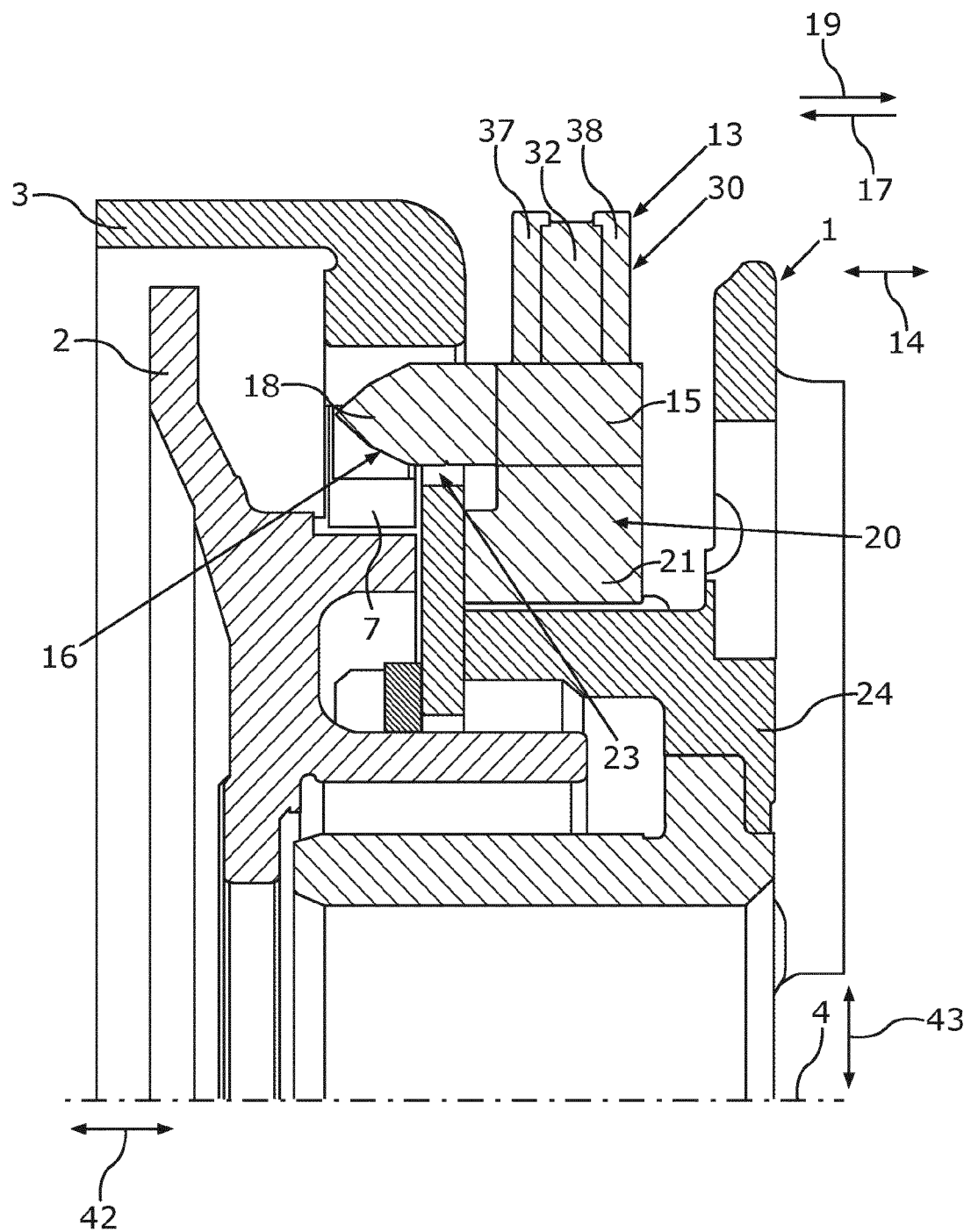
FIG. 2 shows a detail of a schematic and sectional side view of the coupling device.

As can be seen particularly well considered together with FIG. 2, the coupling device 1 has a first component 2 and a second component 3, which is formed separately from the first component 2 and in principle can be rotated about an axis of rotation 4 relative to the first component 2. As will be explained in more detail below, the coupling device 1 is designed to at least temporarily rotationally conjointly connect the components 2 and 3. For this, the coupling device 1 has multiple recesses 5 which are provided on the component 2 and are arranged spaced apart from and following one another in the circumferential direction, running about the axis of rotation 4 and illustrated in FIG. 1 by a double-headed arrow 6, of the respective component 2 and 3. In this context, FIGS. 1 to 5 show a first embodiment of the coupling device 1. The exemplary embodiment shown in FIGS. 1 to 5 provides that the first recesses 5 are formed by the component 2, in particular directly.

The coupling device 1 also comprises blocking elements 7, which are formed separately from the components 2 and 3. It can be seen particularly well from FIG. 1 that the respective blocking element 7 is in the form of a pawl, which can be pivoted relative to the components 2 and 3 about a respective pivot axis 8 between at least a blocking position and at least a release position and as a result can be moved between the release position and the blocking position. Here, the respective pivot axis 8 runs at least substantially parallel to the axis of rotation 4. The blocking position is a first position or is also referred to as first position, and the release position is a second position or is also referred to as second position. In this context, FIG. 1 shows the respective blocking position of the respective blocking element 7. In the exemplary embodiment shown in FIG. 1, the respective blocking element 7 is mounted pivotably on the component 3 via a respective pin 9, for example formed separately from the components 2 and 3, with for example the pin 9 being partially received in the respective blocking element 7. The pin 9 may be partially received in the component and/or the pin 9 is held on the component 3. For example, the blocking element 7 can rotate about the pivot axis 8 relative to the pin 9. As an alternative to this, it is contemplated that the pin 9 is formed in one piece with the respective blocking element 7, with the result that for example the blocking element 7 and the respective associated pin 9 can be pivoted about the pivot axis 8 relative to the component 3. In that case, the blocking element 7 would be mounted pivotably on the component 3 via the pin 9, for example. The exemplary embodiment shown in FIG. 1 also provides that the blocking element 7 is mounted pivotably on the component 3 via the pin 9.

In the respective blocking position, the respective blocking element 7 engages in one of the recesses 5, as a result of which in the blocking position a relative rotation between the components 2 and 3 about the axis of rotation 4 in a direction of rotation illustrated in FIG. 1 by an arrow 10 is prevented by means of the respective blocking element 7, in particular in such a way that in the respective blocking position of the blocking element 7 the component 3 cannot rotate in the first direction of rotation, illustrated by the arrow 10, relative to the component 2. In the release position, however, the respective blocking element 7 is prevented from engaging in the recesses 5, and therefore in the respective release position the respective blocking element 7 is arranged completely outside the first recesses 5. As a result, the blocking elements 7 in the respective release position permit a relative rotation between the components 2 and 3 about the axis of rotation 4 in the first direction of rotation (arrow 10), in particular in such a way that in the release position the component 3 can rotate about the axis of rotation 4 in the first direction of rotation, illustrated by the arrow 10, relative to the component 2. In the present case, however, it is provided that the coupling device 1 here does not utilize or perform any freewheel function in the one or the other direction of rotation. The coupling device 1 is used as a conventional coupling element in the present case.

The coupling device 1 in this case is in the form of a freewheel, in particular a switchable freewheel. In this respect, the blocking elements 7, in particular the coupling device 1 overall, in the respective blocking position of the respective blocking element 7 permit a relative rotation between the components 2 and 3 about the axis of rotation in a second direction of rotation, oppositely directed to the first direction of rotation and illustrated in FIG. 1 by an arrow 11, in such a way that the component 3 can rotate about the axis of rotation 4 in the second direction of rotation, illustrated by the arrow 11, relative to the component 2 both in the blocking position of the blocking elements 7 and in the release position of the blocking elements 7.

The respective blocking element 7 is assigned a respective, in particular mechanical, spring element 12, which is arranged on a first side of the pivot axis 8. The spring element 12 can be supported or is supported on one side against the component 3 and on the other side against the respective blocking element 7. In the respective blocking position the respective spring element 12 is tensioned with the result that in the respective blocking position the respective spring element 12 provides a spring force, by means of which the respective blocking element 7 can be pivoted out of the respective blocking position into the respective release position, and in particular is to be held in the release position. Consequently, for example the spring element 12 is more strongly tensioned in the blocking position than in the release position. The spring element 12 and an action of mass on the blocking element 7 are preferably matched to one another.

The respective blocking position of the respective blocking element 7 corresponds for example to a blocked state of the coupling device 1. In the blocked state, the component 3 is connected to the component 2 for conjoint rotation about the axis of rotation 4 in the first direction of rotation, and can rotate about the axis of rotation 4 in the second direction of rotation relative to the component 2. The respective release position of the respective blocking element 7 corresponds to a released state of the coupling device 1. In the released state, the component 3 can rotate about the axis of rotation 4 both in the first direction of rotation and in the oppositely directed second direction of rotation relative to the component 2. For example, the components 2 and 3 can rotate only slightly by a rotational travel. This rotational travel is utilized for the opening of the freewheel. There is for example a deliberate loading over the one electric machine of the drive train, with it being possible by means of the electric machine to realize for example an eCVT function and a power branching transmission or power split transmission with planetary gear sets as superimposition gear stages, and therefore an opening in the one direction of rotation and subsequently a complete opening of the blocking elements 7.

In order now to be able to realize a particularly advantageous and in particular easy actuation or actuability of the coupling device 1, that is to say in order for example to switch over the coupling device 1 particularly advantageously, in particular especially smoothly, from the released state into the blocked state and/or vice versa, it is the case—as can be seen considered together with FIG. 2—that the respective blocking element 7 is assigned at least one or precisely one actuating device 13. The actuating device 13 can be displaced, that is to say moved in translation, along the axis of rotation 4 relative to the components 2 and 3 and relative to the respectively assigned blocking element 7. This means in particular that the actuating device 13 can be displaced, in particular shifted back and forth, in a movement direction, illustrated in FIG. 2 by a double-headed arrow 14 and running at least substantially parallel to the axis of rotation 4, relative to the components 2 and 3 and relative to the respectively associated blocking element 7.

The actuating device 13 has an actuating element 15, which is formed from a first material. Since it is a constituent part of the actuating device 13, the actuating element 15 can be displaced in translation, that is to say shifted back and forth, along the axis of rotation 4 or along the movement direction relative to the components 2 and 3 and relative to the blocking elements 7. In particular, the actuating device 13 and thus the actuating element 15 can be displaced between at least an actuation position and at least a disengaged position along the axis of rotation 4 relative to the components 2 and 3 and relative to the respective blocking element 7. In the disengaged position, the actuating device 13, in particular the actuating element 15, permits a movement of the respective blocking element 7 out of the blocking position into the release position that is brought about or can be brought about by the respective spring element 12. In other words, in order to permit or to allow or to bring about a movement of the blocking element 7 out of the blocking position into the release position that is brought about or can be brought about by means of the spring element 12, the actuating device 13 and thus the actuating element 15 are displaced out of the actuation position into the disengaged position, for example. However, in order to move the blocking element 7, in particular counter to the spring force provided by the spring element 12, out of the release position into the blocking position and in particular to hold it in the blocking position, in particular counter to the spring force, the actuating device 13 and thus the actuating element 15 are displaced or shifted out of the disengaged position into the actuation position.

By means of the actuating element 15, a movement of the blocking element 7 at least out of one of the positions into the other position can be brought about by displacing the actuating device 13 and thus by displacing the actuating element 15. In the first embodiment, the at least one position is the release position, and therefore the other position in the first embodiment is the blocking position.

In the disengaged position, the actuating element 15 is spaced apart from the associated blocking element 7, in particular from all blocking elements 7, with the result that in the disengaged position the actuating element 15 does not touch the blocking element 7 and thus a movement or the movement of the blocking element 7 out of the blocking position into the release position is not prevented. If now the actuating element 15 is displaced starting from the disengaged position into the or in the direction of the actuation position, firstly the actuating element 15, which is initially spaced apart from the blocking element 7, comes to lie directly in a supporting manner against and thus comes into direct contact with the blocking element 7.

It can be seen from FIG. 2 that the actuating element 15, which is also referred to as plunger or ram, in particular at its head 16 has a, for example, at least substantially conical region 18, which tapers in the movement direction and here for example in the disengaged position and in a direction which runs parallel to the movement direction toward the blocking element 7 and is illustrated in FIG. 2 by an arrow 17. When the actuating device 13 is being moved out of the disengaged position into the actuation position, the region 18 of the actuating element 15 comes to lie in a supporting manner against the blocking element 7, which is initially located in the release position. If the actuating element 15 continues to be moved in the direction of the actuation position, the blocking element 7 slides off on the region 18 and thus on the actuating element 15. Since the region 18 tapers in the direction illustrated by the arrow 17 and widens in one of the second directions illustrated by the arrow 17 and in FIG. 2 by an arrow 19, with progressive movement of the actuating element 15 in the direction of the actuation position the blocking element 7 is moved, in particular pressed, gradually out of the blocking position into the release position, since in the process the blocking element 7 slides off on the region 18. In this case, the pivot axis 8 runs at least substantially parallel to the movement direction illustrated by the double-headed arrow 14, parallel to the direction illustrated by the arrow 17, and parallel to the direction illustrated by the arrow 19, which is oppositely directed to the direction illustrated by the arrow 17. In order to displace the actuating device 13 out of the disengaged position into the actuation position, the actuating device 13 is shifted in the direction illustrated by the arrow 17 relative to the components 2 and 3, with the direction illustrated by the arrow 17 running parallel to the movement direction. In order to displace the actuating device 13 out of the actuation position into the disengaged position, the actuating device 13 is displaced in the direction illustrated by the arrow 19 relative to the components 2 and 3. In this context, the direction illustrated by the arrow 19 also runs parallel to the movement direction. By displacing the actuating device 13 out of the actuation direction into the disengaged position, the spring element 12 can expand, with the result that the blocking element 7 is moved out of the blocking position into the release position by means of the spring element or by means of the spring force provided by the spring element.

For example, when the actuating device 13 is being moved out of the disengaged position into the actuation position, at least one wall region of the blocking element 7 slides off on the region 18 of the actuating element 15, with the stated wall region of the blocking element 7 being arranged on a second side, situated opposite the first side, of the pivot axis 8. Consequently, the spring element 12 is arranged for example on the other side of the pivot axis 8 and the wall region is arranged on this side of the pivot axis 8, with the result that the pivot axis 8, in particular in the direction of longitudinal extent of the blocking element 7, is arranged between the spring element 12 and the stated wall region. As a result, the actuating element 15, when it is displaced out of the disengaged position into the actuation position, exerts such a torque on the blocking element 7 that the blocking element 7 is pivoted counter to the spring force provided by the spring element 12 out of the release position into the blocking position. By contrast, the spring force brings about an oppositely directed second torque, by means of which the blocking element 7 can be pivoted or is pivoted out of the blocking position into the release position when the actuating device 13 is shifted into the release position.

Furthermore, the actuating device 13 comprises a carriage 21, which is formed from a second material in the form of a plastic 20, which second material is different than the first material, from which the actuating element 15 is formed. In other words, a carriage 21, formed from the plastic 20 and also referred to as carrier, basic carrier or basic body, is formed by the plastic 20. In this context, the actuating element 15 is provided with the plastic 20 such that the actuating element 15 is connected to the carriage 21 and can be displaced with the carriage 21 along the axis of rotation 4 relative to the components 2 and 3 between the disengaged position and the actuation position. In this respect, it is the case—as can be seen particularly well considered together with FIG. 8—that at least one positioning element 22, by means of which a relative rotation between the actuating device 13 and the second component 3 about the axis of rotation 4 both in the first direction of rotation and in the second direction of rotation is at least delimited, in particular avoided or prevented, is formed by the plastic 20.

It can be seen from FIGS. 1 and 2 that the actuating element 15, at least in the actuation position shown in FIGS. 1 and 2, passes through a corresponding through-opening 23 in the component 3. In the first embodiment, the through-opening 23 is completely circumferentially closed along its circumferential direction. Since the component 3 has the through-openings 23 for the actuating elements 15, the component 3 is also referred to as pocket plate, perforated plate or perforated sheet. In this respect, a precise positioning of the respective actuating device 13 relative to the component 3 about the axis of rotation 4 is desirable and advantageous, in order for example to avoid excessive relative rotations between the component 3 and the actuating device 13. This makes it possible to avoid for example the actuating element 15 coming into unfavorable contact with a wall region, which delimits the respective through-opening 23, of the component 3, with the result that for example jamming of the actuating device 13 and thus of the coupling device 1 overall can be avoided.

In a method for producing the coupling device 1, which method is also referred to as a production method, for example the actuating element 15 is placed into a mold of an injection molding tool, by means of which tool an injection molding process, that is to say an injection molding operation, is carried out. After the actuating element 15 has been placed or introduced into the mold, for example the plastic 20 is introduced, in particular injected, into the mold, as a result of which the plastic 20 is sprayed against the actuating element 15. In the process, the carriage 21 is formed from the plastic 20, and the carriage 21 is connected to the actuating element 15.

In principle, it is contemplated that the positioning element 22 has a projection, such as for example a rib, which is formed by the plastic 20 and engages in a corresponding recess, as a result of which the relative rotation between the actuating device 13 and the second component 3 about the axis of rotation 4 is at least delimited or prevented. Expressed generally, what is provided preferably is a form-fitting rotation-prevention means for moderate torque loading, in order to avoid an excessive relative rotation between the actuating element 15 and the component 3. This rotation-prevention means should not lead to stick-slip or static friction effects by way of what is known as the drawer effect or a "length over thickness dimension" that is too small, and should be easily producible and easy to calibrate.

It can be seen particularly well from FIG. 2 that the actuating device 13 is arranged displacably on a third component 24 of the coupling device 1. The third component 24 is formed separately from the components 2 and 3 and is for example also referred to as hub. In particular, the component 24 is rotationally conjointly connected to the component 3, with the result that the components 3 and 24 can rotate together about the axis of rotation 4 relative to the component 2, or vice versa. The abovementioned receptacle in this case is provided for example on the component 24, in particular is formed directly by the component 24. Since the positioning element 22 is formed by the plastic 20, the positioning element 22 is a constituent part of the actuating device 13. Consequently, the positioning element 22 can be displaced along the axis of rotation 4 relative to the components 2, 3 and 24 and thus for example also relative to the receptacle.

Figure 8:
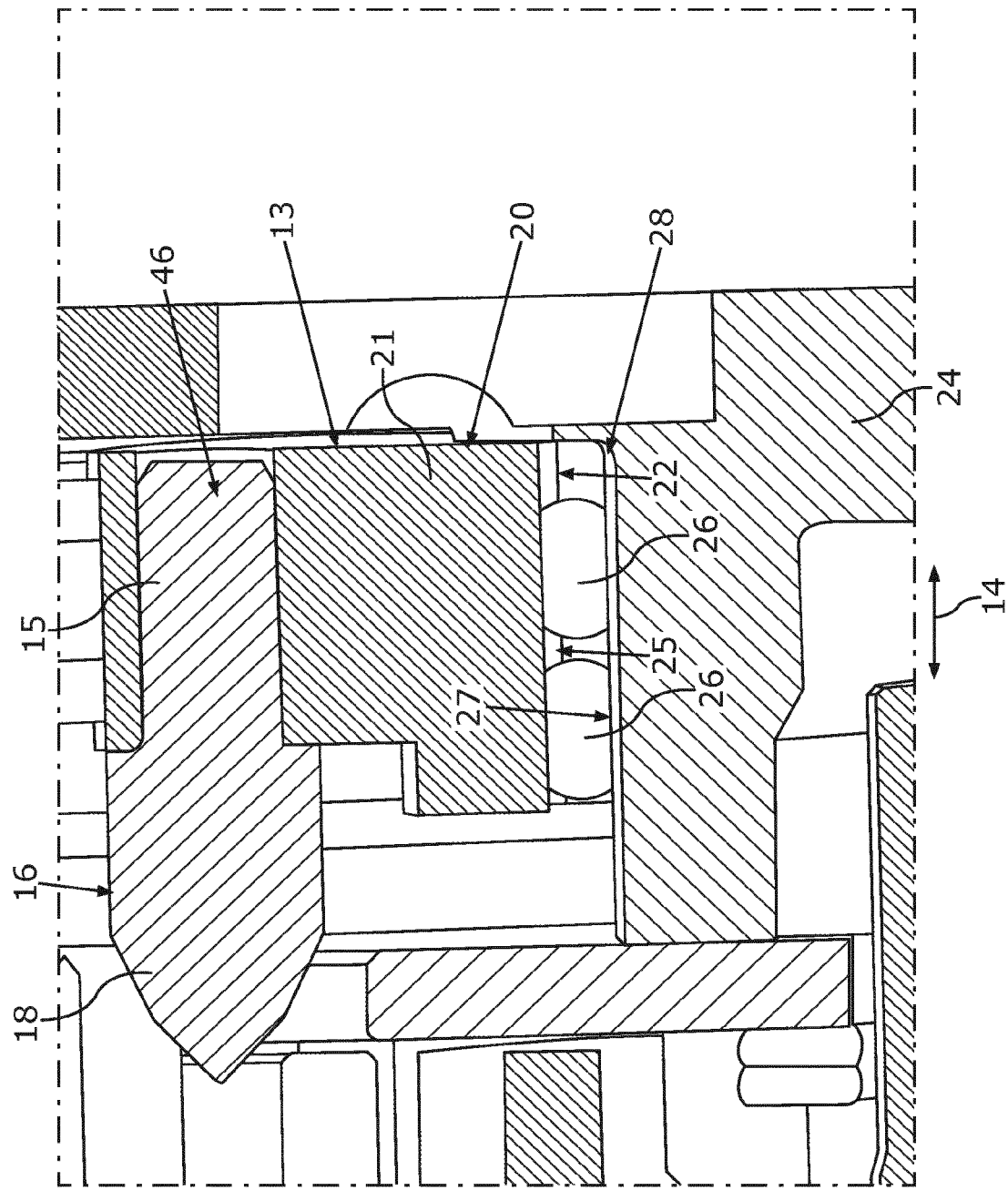
FIG. 8 shows a detail of a further schematic and sectional side view of the coupling device according to the third embodiment.

As can be seen considered together with FIG. 8, the first embodiment provides, however, that the positioning element 22 has a second recess 25 delimited by the plastic 20. At least one corresponding positioning part 26, which is formed separately from the positioning element 22, engages in the recess 25. In the present case, multiple positioning parts 26 engage in the second recess 25 at the same time. The respective positioning part 26 is formed separately from the components 2, 3 and 24 and also separately from the actuating device 13 and thus separately from the carriage 21 or from the plastic 20, with the positioning part 26 being formed from a different material than the plastic 20. Preferably, the material is a metallic material, in particular a steel. It is also contemplated that the material is ceramic.

Since the respective positioning part 26 engages in the corresponding second recess 25, the relative rotation between the actuating device 13 and the components 3 and 24 about the axis of rotation 4 both in the first direction of rotation and in the second direction of rotation is at least limited, in particular prevented. For this, the positioning part 26, which is formed for example separately from the component 24, is arranged or held on the component 24 in such a way that a relative rotation between the component 24 and the respective positioning part 26 about the axis of rotation 4 both in the first direction of rotation and in the second direction of rotation is at least delimited, in particular avoided or prevented. For this, the component 24 has for example a third recess 27, also referred to as receptacle, in which the positioning part 26 engages, as a result of which a relative rotation between the component 24 and the positioning part 26 about the axis of rotation 4 both in the first direction of rotation and in the second direction of rotation is at least delimited, in particular prevented. The above embodiments and the following embodiments relating to the component 24 can readily also be transferred to the component 3, and vice versa. For example, the third recess 27 is formed directly by the component 24, and therefore for example the positioning part 26 can directly touch the component 24.

In the first embodiment, the respective positioning part 26 is a rolling body of a rolling-bearing support 28, by way of which rolling-bearing support the actuating device 13 is mounted displacably along the axis of rotation 4 on the component 24. The component 24 is thus a module formed separately from the component 3 and rotationally conjointly connected to the component 3. The feature whereby the components 24 and 3 are rotationally conjointly connected to one another can in particular be understood to mean that relative rotations between the components 3 and 24 about the axis of rotation 4 both in the first direction of rotation and in the second direction of rotation are avoided.

In the present case, the rolling-bearing support 28 is in the form of a ball-bearing support, in particular a linear-ball-bearing support, and therefore the positioning part 26 is in the form of a ball and in the present case a linear-ball-bearing element. The linear-ball-bearing support may have a segment-like form or may be formed such that it is guided via a closed bearing ring on the hub (component 24).

If the actuating device 13 is displaced along the axis of rotation 4 relative to the components 3 and 24, the positioning parts 26 roll off on respective raceways provided on the carriage 21 and on the component 24, while the positioning parts 26 engage in the recesses 25 and 27 and thus avoid excessive relative rotations between the components 2 and 3 about the axis of rotation. In this respect, it is contemplated that a first one of the raceways is formed directly by the component 24, with the result that the first raceway is provided or arranged on the component 24. Consequently, the positioning parts 26 touch the first raceway or the component 24 directly, for example. A second one of the raceways is provided for example on the carriage 21 and may be formed directly by the plastic 20 in this case, such that for example the positioning parts 26 roll off directly on the plastic 20.

As an alternative to this, it is contemplated that arranged in particular in the radial direction of the components 2, 3 and 24, between the carriage 21 and the respective positioning part 26 and thus between the plastic 20 and the respective positioning part 26, is an intermediate element, which is formed from a different material than the plastic 20, in particular from a metallic material. In this respect, the intermediate element forms for example the second raceway, with the result that for example the respective positioning part 26 rolls off directly on the intermediate element. In this context, it may in particular be provided that not only the actuating element 15 but also the intermediate element are placed into the mold. By introducing, in particular injecting, the plastic 20 into the mold, the plastic 20 is injection molded both onto the actuating element 15 and onto the intermediate element, as a result of which the actuating element 15 and the intermediate element are connected to the plastic 20 or to the carriage 21. Consequently, the actuating element 15 and the intermediate element are held on one another or connected to one another via the carriage 21.

The intermediate element is in this case arranged in particular in the recess 25 and delimits for its part a fourth recess, in which the respective positioning part 26 engages.

The engagement of the positioning part 26 in the recess 25 or in the fourth recess should in particular be understood to mean that, in the circumferential direction running around the axis of rotation 4 and here both in the first direction of rotation and in the second direction of rotation, the positioning part 26 is covered respectively partially by the carriage 21 or by the plastic 20 and for example also by the intermediate element. This avoids excessive relative rotations between the actuating device 13 and the component 24 and thus between the actuating device 13 and the component 3. It can be seen from FIGS. 3 to 5 that the coupling device 1 according to the first embodiment has an actuator 29, also referred to as actuating means.

The actuator 29 is in the form of a linear actuator, which is also referred to as linear actuating means. By means of the actuator 29, the actuating device 13 can be moved back and forth between the disengaged position and the actuation position by utilizing electrical energy or electrical current. For this, the actuator 29 comprises a rotor 30, which comprises for example the actuating device 13.

Figure 3:
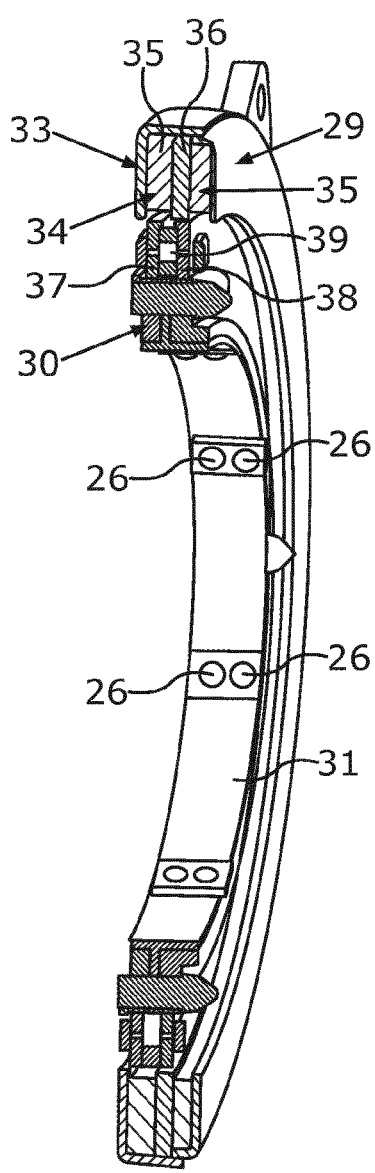
FIG. 3 shows a detail of a schematic and sectional perspective view of the coupling device.
Figure 4:
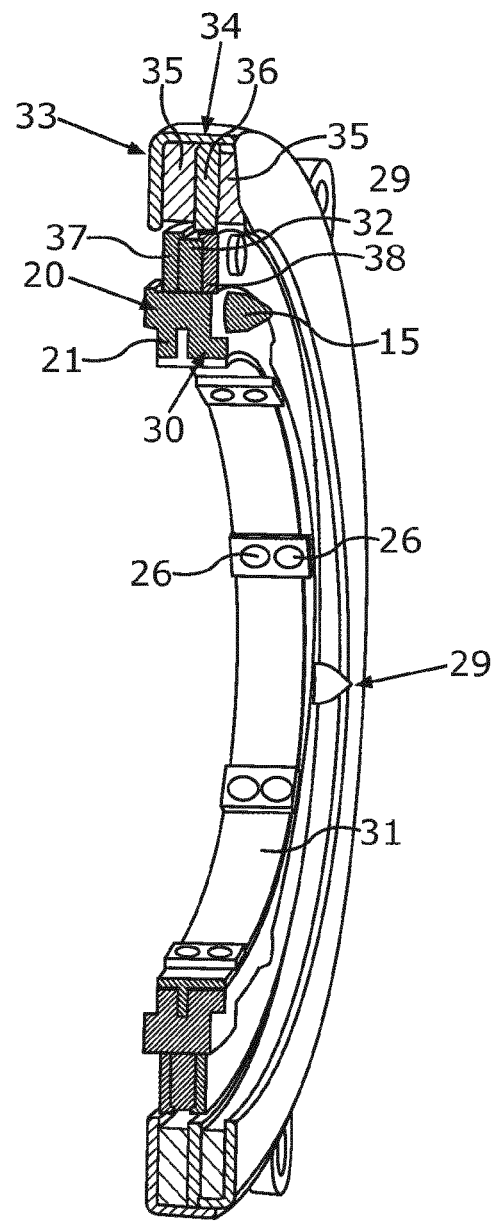
FIG. 4 shows a detail of a further schematic and sectional perspective view of the coupling device.
Figure 5:
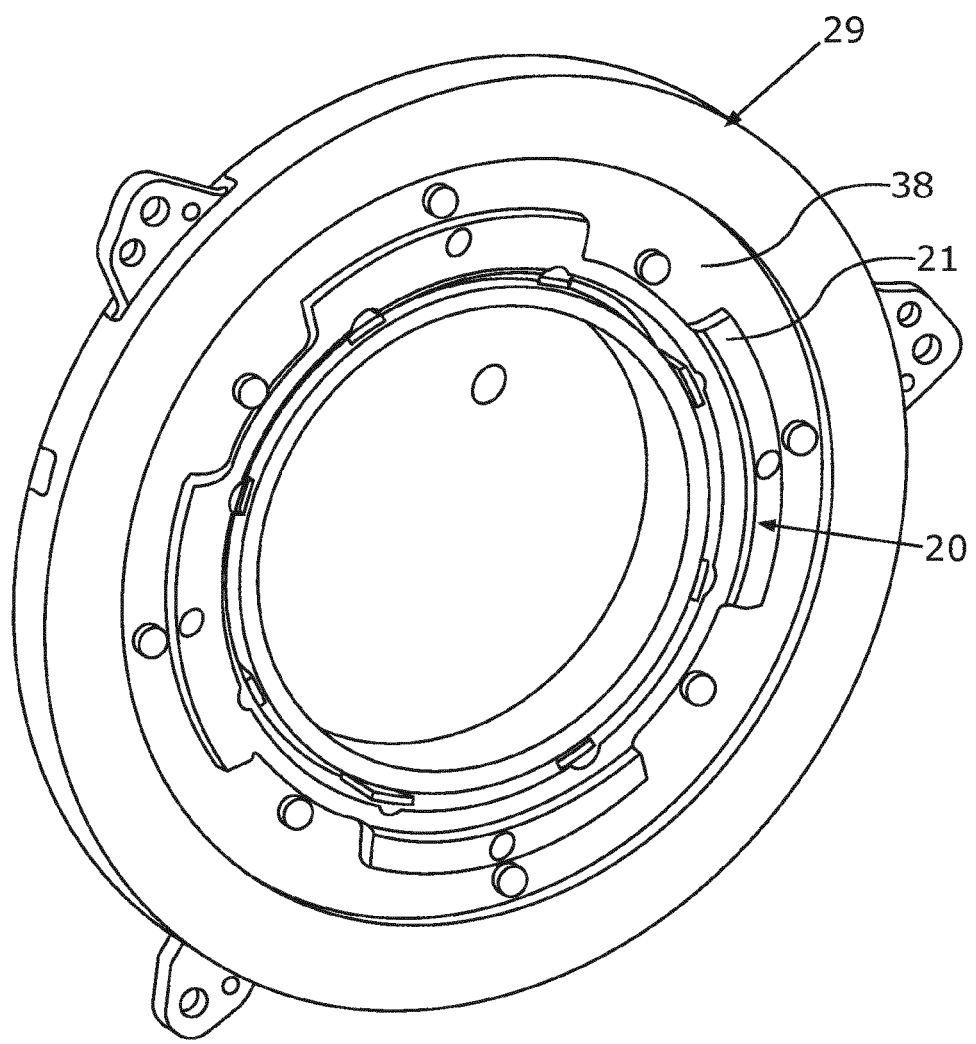
FIG. 5 shows a detail of a schematic perspective view of the coupling device.

The positioning parts 26 and the intermediate element, which is denoted by 31 in FIGS. 3 and 4 and may be in the form of a shell, in particular bearing shell, for example, can also be seen particularly well from FIGS. 3 and 4.

The actuator 29, in particular the rotor 30, also comprises at least one magnet, which is preferably in the form of a permanent magnet 32. In other words, the actuating device 13 comprises a magnet, in the present case in the form of a permanent magnet 32, which is a constituent part of the rotor 30 and thus of the actuator 29. The actuator 29 further comprises a stator 33, which is fixed for example to the abovementioned housing. The stator 33 has at least one winding 34, which forms at least one or more coils 35 of the stator 33. The coil 35 is held for example on a carrier element 36 of the stator 33 or wound around the carrier element 36. By means of the stator 33, the rotor 30 can be driven and thus displaced along the axis of rotation 4 relative to the components 2 and 3, as a result of which the actuating device 13 can be displaced along the axis of rotation 4 and thus displaced between the disengaged position and the actuation position. For this, the winding 34 is supplied with an electrical current, for example, which flows through the winding 34 and thus through the coils 35. As a result, the winding 34 provides at least one magnetic field, by means of which the rotor 30 and thus the actuating device 13 are driven and thus displaced along the axis of rotation 4 relative to the components 2 and 3.

In this respect, the permanent magnet 32 is at least partially, in particular at least predominantly or completely, embedded in the plastic 20 and thus connected to the carriage 21. In this case, it is contemplated for example that not only the actuating element 15 but also the permanent magnet 32 are placed into the abovementioned mold. If the plastic 20 is then introduced, in particular injected, into the mold, the plastic 20 is injection molded onto both the actuating element 15 and the permanent magnet 32. This connects the actuating element 15 and the permanent magnet 32 to the carriage 21.

In this respect, the permanent magnet 32 is at least partially, in particular at least predominantly or completely, covered by a first covering plate 37 in the direction illustrated by the arrow 17. The permanent magnet 32 is at least partially, in particular at least predominantly or completely, covered by a second covering plate 38 in the direction which is illustrated by the arrow 19 and is oppositely directed to the direction illustrated by the arrow 17. The respective covering plate 37 or 38 is formed from a ferromagnetic material and/or from a ferritic steel. In this respect, the respective covering plate 37 or 38 is also at least partially embedded in the plastic 20, for example, and thus connected to the carriage 21. It is likewise conceivable here that the respective covering plate 37 or 38 is placed into the abovementioned mold and has the plastic 20 injection molded onto it when the plastic 20 is being introduced into the mold. This connects the respective covering plate 37 or 38 to the plastic 20 or to the carriage 21. The covering plates 37 and 38 may be formed separately from one another and here may be formed in one piece with one another. It is also contemplated that the covering plate 37 and/or the covering plate 38 are/is formed in one piece with the intermediate element 31.

A connecting element 39, which is in the form of a rivet or bolt, for example, and by means of which for example the carriage 21 and the covering plates 37 and 38 are connected to one another, can be seen from FIG. 3. In this case, the connecting element 39 passes through the covering plates 37 and 38 and also the carriage 21. By embedding the respective covering plate 37 or 38 in the plastic 20 and/or by configuring the respective covering plate 37 or 38 in one piece with the intermediate element 31, the connecting element 39 could be dispensed with, and therefore the number of parts and thus the costs, the weight and the installation space requirement of the coupling device 1 can be kept within a particularly low range. This riveted connection is not imperatively necessary; the encapsulation by plastics injection molding may also be configured in such a way that the plastic encloses some formations on the covering plates 37 and 38 in a form fit in the axial direction.

Figure 6:
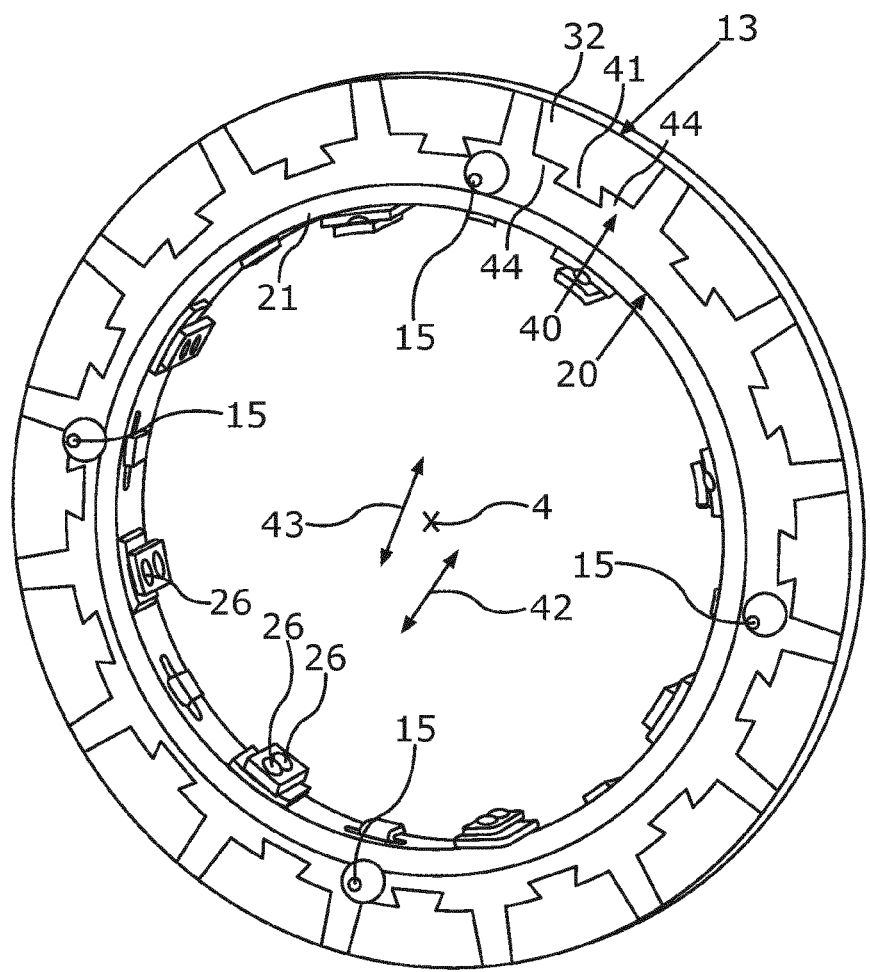
FIG. 6 shows a schematic perspective view of a part of the coupling device according to a second embodiment.

FIG. 6 shows at least a part of the actuating device 13 of the coupling device 1 according to a second embodiment. For example, it can be seen particularly well that the carriage 21, which is formed by the plastic 20, is in the form of a ring, by way of which the multiple actuating elements 15, in particular all actuating elements, which are formed separately from one another and are also referred to as plunger are connected to one another. What can moreover be seen particularly well from FIG. 6 is the respective permanent magnet 32, which on its side 40, which faces inwardly in the radial direction of the components 2 and 3 and thus of the actuating device 13 and is also referred to as inner side, has a region 41, which is referred to as connecting region and in the second embodiment is in the form of a dovetail or dovetail profile. While the axial direction of the components 2, 3 and 24 in the actuating device 13 runs parallel to the axis of rotation 4 or coincides with the axis of rotation 4 and is illustrated for example in FIGS. 1 and 2 by a double-headed arrow 42, the radial direction, which is illustrated in FIGS. 1 and 2 by a double-headed arrow 43, runs perpendicularly to the axial direction.

Also arranged on the side 40 are wall regions 44 of the plastic 20. In this respect, the region 41 of the permanent magnet 32 is radially outwardly at least partially, in particular at least predominantly or completely, covered by the plastic 20 or by the wall regions 44 thereof. This connects the permanent magnet 32 to the carriage 21 in a form fit at least radially outwardly and thus holds it in a form fit on the carriage 21.

Figure 7:
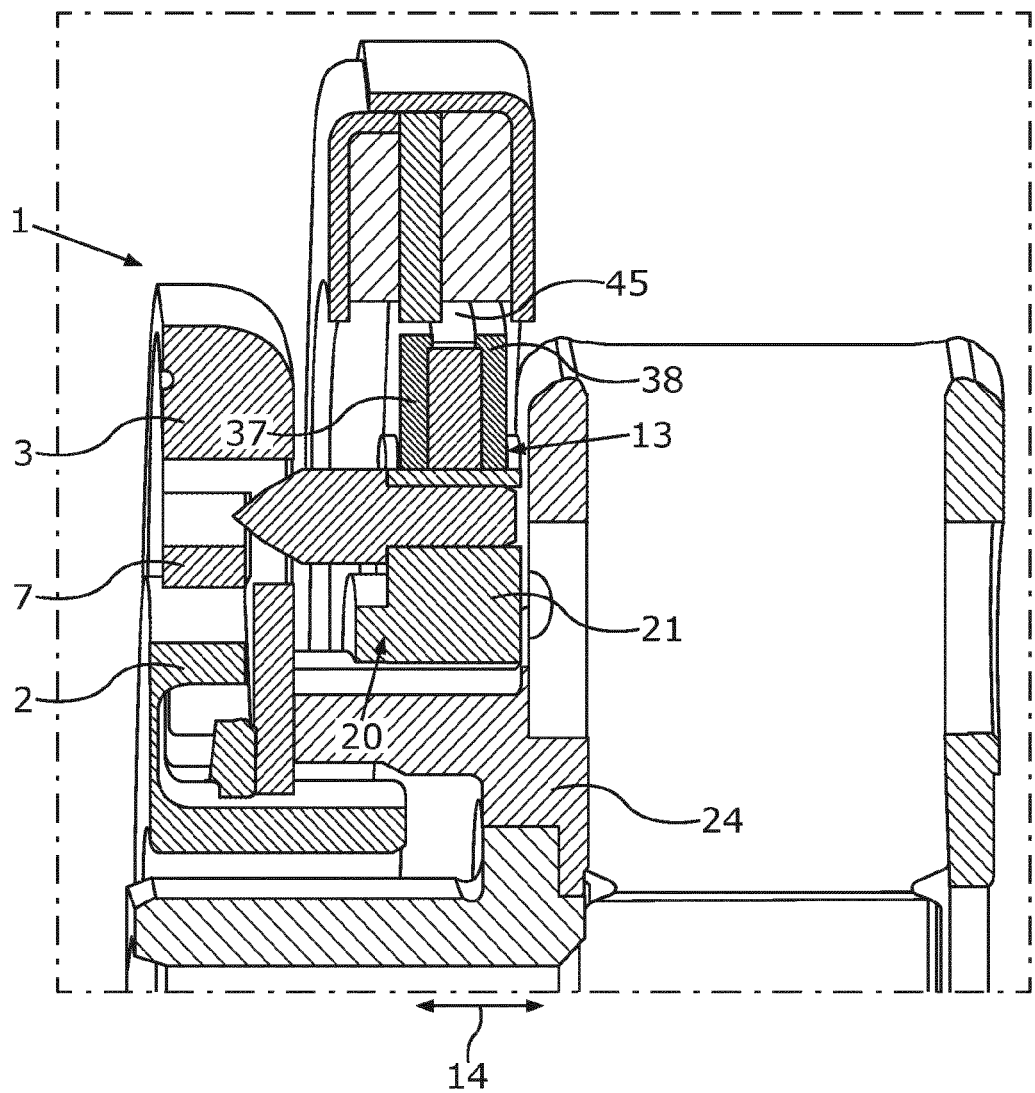
FIG. 7 shows a detail of a schematic and sectional side view of the coupling device according to a third embodiment.

What can be seen from FIG. 7 is a banding 45, also referred to as a centrifugal force banding, which is formed for example separately from the covering plates 37 and 38, separately from the permanent magnet 32, separately from the actuating element 15 and separately from the plastic 20 or separately from the carriage 21. For example, the banding 45 is wound around the permanent magnets 32 and the permanent magnets are thereby radially outwardly covered by the banding 45. The banding 45 should prevent excessive relative movements, caused by centrifugal force, between the respective permanent magnet 32 and the carriage 21.

Since for example the second embodiment (FIG. 6) provides that the permanent magnet 32 is held at least radially outwardly in a form fit on the carriage 21, in particular in the way described above, it is possible for example to dispense with the banding 45. This makes it possible to keep the number of parts and thus the weight, the costs and the installation space requirement within a particularly low range. Overall, it can be seen from FIG. 6 that the respective permanent magnet 32 is shaped such that and thus has the plastic 20 injection molded around or onto it such that the permanent magnet 32 is secured in a form fit on the carriage 21 against a radially outwardly directed action of centrifugal force.

In particular, it is contemplated firstly to produce the carriage 21, in particular independently of the actuating element 15. After producing the carriage 21, for example the actuating element 15, which is also referred to as ram, is arranged on the carriage 21 and in particular connected to the carriage 21, for example in such a way that the actuating element 15 is inserted into the carriage 21. For example, the actuating element 15 is connected to the carriage 21 in such a way, in particular after the carriage 21 has been produced, that the actuating element 15 is connected, in particular caulked and/or clamped, in a material bond and/or a form fit to the carriage 21, which is produced separately from the actuating element 15 and independently of the actuating element 15. Consequently, the feature whereby the actuating element 15 is provided with the plastic 20 is in particular to be understood to mean that the actuating element 15 is connected to the plastic 20 or to the carriage 21 formed by the plastic 20, with the actuating element 15 directly touching the plastic 20, for example. In this respect, it is contemplated that the carriage 21 and the actuating element 15 are produced separately from one another and, after their respective production, connected to one another. However, it has been found to be particularly advantageous when the plastic 20 is injection molded onto the actuating element 15 in particular during or in the course of the production of the carriage 21.

The plastic 20 is preferably a dimensionally stable plastics material which is suitable for use in a drive train, in particular in a transmission, of an automobile and here also can withstand for example high temperatures and/or direct contact with liquids, such as for example an oil, without sustaining damage.

FIGS. 7 and 8 show a third and a fourth embodiment, in which the second material is likewise the plastic 20. In this case, the actuating element 15 comprises the head 16 and a shank 46, which is formed in one piece with the head 16 and has a smaller external circumference, in particular a smaller external diameter, than the head 16. Here, the head 16 forms the abovementioned region 18. The carriage 21 (basic body) is here connected to the actuating element 15 in such a way that the actuating element 15, in particular the shank 46, is arranged in the carriage 21 with the plastic 20. It is fundamentally contemplated to produce the actuating element 15 and the carriage 21 separately from one another and, after their respective production, to connect them to one another, by arranging the actuating element 15, in particular the shank 46, in the carriage 21. For this, the shank 46 is pushed into the carriage 21, for example. However, it has been found to be particularly advantageous when the actuating element 15, after it has been produced, is placed into the mold and has the plastic 20 (second material) injection molded onto it, with the result that at the same time the carriage 21 is produced from the plastic 20 and connected to the actuating element 15, in particular via the shank 46. The head 16 forms for example the region 18, or the region 18 is provided on the head 16 and for example hardened.

Figure 9:
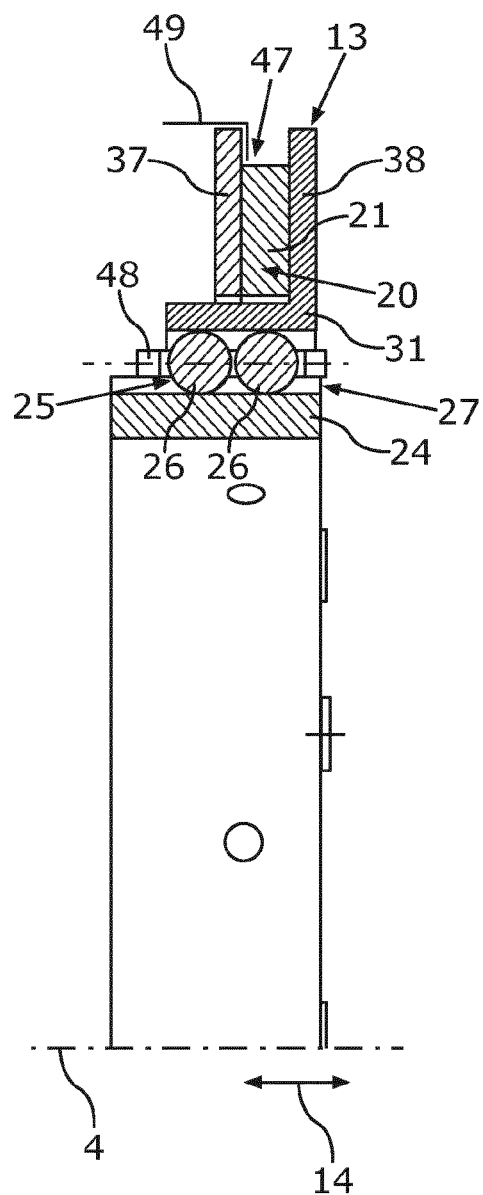
FIG. 9 shows a detail of a schematic and sectional side view of the coupling device according to a fifth embodiment.
Figure 10:
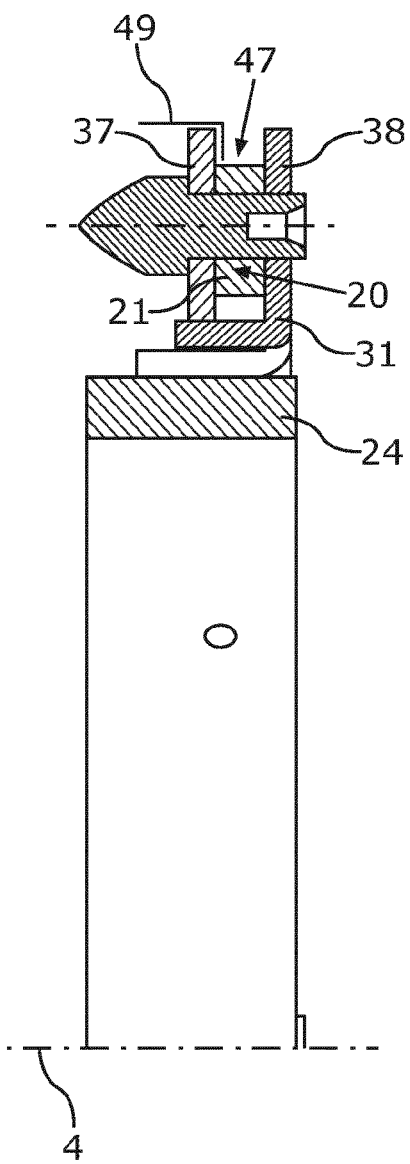
FIG. 10 shows a detail of a further, schematic and sectional side view of the coupling device according to the fifth embodiment.

Finally, FIGS. 9 and 10 show a fifth embodiment. In the fifth embodiment, the actuator 29 can be dispensed with. In the fifth embodiment, the plastic 20 or the carriage 21 forms or delimits a groove 47 at least partially, with the groove 47 being radially inwardly at least partially, in particular at least predominantly or completely, delimited by the plastic 20 in the fifth embodiment.

In the direction illustrated by the arrow 17, the groove 47 is delimited for example by the covering plate 37, and in the direction illustrated by the arrow 19 the groove 47 is delimited for example by the covering plate 38. In the fifth embodiment, the covering plate 38 is formed in one piece with the intermediate element 31, with the covering plate 38 and thus the intermediate element 31 being connected to the plastic 20 and thus to the carriage 21, and also the covering plate 37 is connected to the plastic 20 and thus to the carriage 21. Consequently, the intermediate element 31, the covering plate 37 and the covering plate 38 are connected to one another via the carriage 21 or via the plastic 20. What can also be seen from FIGS. 9 and 10 is a cage 48, also referred to as a rolling-body cage, by means of which for example the positioning parts 26 are guided and/or held spaced apart from one another.

An actuating part 49, which is formed separately from the actuating device 13 and is for example an actuating fork or shifting fork, may engage in the groove 47. The actuating part 49 can be displaced along the axis of rotation 4 relative to the components 2, 3 and 24, as a result of which the actuating device 13 can be conjointly displaced with the actuating part 49.

LIST OF REFERENCE SIGNS

1 Coupling device
2 Component
3 Component
4 Axis of rotation
5 Recess
6 Double-headed arrow
7 Blocking element
8 Pivot axis
9 Pin
10 Arrow
11 Arrow
12 Spring element
13 Actuating device
14 Double-headed arrow
15 Actuating element
16 Head
17 Arrow
18 Region
19 Arrow
20 Plastic
21 Carriage
22 Positioning element
23 Through-opening
24 Component
25 Recess
26 Positioning part
27 Recess
28 Rolling-bearing support
29 Actuator 30 Rotor
31 Intermediate element
32 Permanent magnet
33 Stator
34 Winding
35 Coil
36 Carrier element
37 Covering plate
38 Covering plate
39 Connecting element
40 Side
41 Region
42 Double-headed arrow
43 Double-headed arrow
44 Wall region
45 Banding
46 Shank
47 Groove
48 Cage
49 Actuating part

What is claimed is:

1. A coupling device for a vehicle, comprising:
a first component;
a second component that is rotatable about an axis of rotation relative to the first component;
at least one recess provided on the first component;
at least one blocking element, which is held movably on the second component and is movable relative to the first and second components between at least a blocking position as a first position, in which the blocking element engages in the recess and as a result prevents a relative rotation between the first and second components about the axis of rotation in at least one direction of rotation, and at least one release position as a second position, in which the blocking element is prevented from engaging in the recess, as a result of which the blocking element in the release position permits a relative rotation between the first and second components about the axis of rotation in the direction of rotation; and
at least one actuating device, which is displaceable along the axis of rotation relative to the first and second components and relative to the blocking element, the actuating device comprising
an actuating element, formed from a first material, by which a movement of the blocking element at least out of one of the positions into the other position can be brought about by displacing the actuating device, and
a basic body, which is formed from a second material different than the first material and which is connected to the actuating element, wherein at least one positioning element, by which a relative rotation between the actuating device and the second component about the axis of rotation is at least delimited, is formed by the second material,
wherein the second material is a plastic, which is injection molded onto the actuating element.

2. The coupling device according to claim 1, wherein the positioning element has a projection, which is formed by the second material and engages in a corresponding recess, as a result of which the relative rotation between the actuating device and the second component about the axis of rotation is at least delimited.

3. The coupling device according to claim 2, wherein the recess is formed directly by the second component or by a third component of the coupling device, which third component is formed separately from the second component and is rotationally conjointly connected to the second component.

4. The coupling device according to claim 1, wherein the positioning element has a second recess, which is delimited by the second material and in which at least one corresponding positioning part formed separately from the positioning element engages, as a result of which the relative rotation between the actuating device and the second component about the axis of rotation is at least delimited.

5. The coupling device according to claim 4, wherein the positioning part directly touches the second material.

6. The coupling device according to claim 4, wherein arranged in the second recess between the second material and the positioning part is an intermediate element, which is formed separately from the positioning part, is formed from a different material than the second material, and on which the positioning part is supportable or is supported directly.

7. The coupling device according to claim 6, wherein the material of the intermediate part is a metallic material.

8. The coupling device according to claim 4, wherein the positioning part is a rolling body of a rolling-bearing support, by way of which rolling-bearing support the actuating device is mounted so as to be displaceable along the axis of rotation on the second component or on a module of the coupling device, which module is formed separately from the second component and rotationally conjointly connected to the second component.

9. The coupling device according to claim 8, wherein the rolling-bearing support is a linear-ball-bearing support.

10. The coupling device according to claim 1, wherein at least one magnet by which the actuating device is displaceable along the axis of rotation is at least partially embedded in the second material.

11. The coupling device according to claim 10, wherein the magnet is a permanent magnet.

12. The coupling device according to claim 10, wherein the magnet is at least partially covered in at least one direction running parallel to the axis of rotation, by a covering plate formed from a ferromagnetic material and/or from ferritic steel.

13. The coupling device according to claim 12, wherein arranged in the second recess between the second material and the positioning part is an intermediate element, which is formed separately from the positioning part, is formed from a different material than the second material, and on which the positioning part is supportable or is supported directly, and
the covering plate is formed in one piece with the intermediate element.

14. The coupling device according to claim 1, wherein the second material at least partially forms a groove for an actuating part which is formed separately from the actuating device, is displaceable along the axis of rotation relative to the components, and by which the actuating device is displaceable by displacing the actuating part.

15. A drive device for an automobile comprising at least one coupling device according to claim 1.

16. A coupling device for a vehicle, comprising:
a first component;
a second component that is rotatable about an axis of rotation relative to the first component;

at least one recess provided on the first component;

at least one blocking element, which is held movably on the second component and is movable relative to the first and second components between at least a blocking position as a first position, in which the blocking element engages in the recess and as a result prevents a relative rotation between the first and second components about the axis of rotation in at least one direction of rotation, and at least one release position as a second position, in which the blocking element is prevented from engaging in the recess, as a result of which the blocking element in the release position permits a relative rotation between the first and second components about the axis of rotation in the direction of rotation; and at least one actuating device, which is displaceable along the axis of rotation relative to the first and second components and relative to the blocking element, the actuating device comprising an actuating element, formed from a first material, by which a movement of the blocking element at least out of one of the positions into the other position can be brought about by displacing the actuating device, and a basic body, which is formed from a second material different than the first material and which is connected to the actuating element, wherein at least one positioning element, by which a relative rotation between the actuating device and the second component about the axis of rotation is at least delimited, is formed by the second material, wherein the positioning element has a projection, which is formed by the second material and engages in a corresponding recess, as a result of which the relative rotation between the actuating device and the second component about the axis of rotation is at least delimited.

17. A coupling device for a vehicle, comprising:

a first component;

a second component that is rotatable about an axis of rotation relative to the first component;

at least one recess provided on the first component;

at least one blocking element, which is held movably on the second component and is movable relative to the first and second components between at least a blocking position as a first position, in which the blocking element engages in the recess and as a result prevents a relative rotation between the first and second components about the axis of rotation in at least one direction of rotation, and at least one release position as a second position, in which the blocking element is prevented from engaging in the recess, as a result of which the blocking element in the release position permits a relative rotation between the first and second components about the axis of rotation in the direction of rotation; and at least one actuating device, which is displaceable along the axis of rotation relative to the first and second components and relative to the blocking element, the actuating device comprising an actuating element, formed from a first material, by which a movement of the blocking element at least out of one of the positions into the other position can be brought about by displacing the actuating device, and a basic body, which is formed from a second material different than the first material and which is connected to the actuating element, wherein at least one positioning element, by which a relative rotation between the actuating device and the second component about the axis of rotation is at least delimited, is formed by the second material, wherein at least one magnet by which the actuating device is displaceable along the axis of rotation is at least partially embedded in the second material.

\* \* \* \* \*